(12) United States Patent
Pan et al.

(10) Patent No.: US 10,887,114 B2
(45) Date of Patent: Jan. 5, 2021

(54) MANAGING COMMUNICATIONS AMONG CONSENSUS NODES AND CLIENT NODES

(71) Applicant: Advanced New Technologies Co., Ltd., Grand Cayman (KY)

(72) Inventors: Dong Pan, Hangzhou (CN); Xuebing Yan, Hangzhou (CN); Shenglong Chen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/390,464

(22) Filed: Apr. 22, 2019

(65) Prior Publication Data

US 2019/0253265 A1  Aug. 15, 2019

Related U.S. Application Data

(63) Continuation of application No. PCT/CN2018/114417, filed on Nov. 7, 2018.

(51) Int. Cl.
*H04L 9/32* (2006.01)
*H04L 9/08* (2006.01)
(Continued)

(52) U.S. Cl.
CPC .......... *H04L 9/3268* (2013.01); *H04L 9/0637* (2013.01); *H04L 9/083* (2013.01);
(Continued)

(58) Field of Classification Search
CPC ....... H04L 9/3268; H04L 9/0637; H04L 9/30; H04L 9/3247; H04L 9/083; H04L 9/3239; H04L 2209/38; H04L 29/06; H04L 9/32
See application file for complete search history.

(56) References Cited

U.S. PATENT DOCUMENTS

| 7,702,902 B2 | 4/2010 | Thayer et al. |
| 8,627,065 B2 | 1/2014 | Leggette et al. |

(Continued)

FOREIGN PATENT DOCUMENTS

| CN | 107566337 A | 1/2018 |
| CN | 107592292 A | 1/2018 |

(Continued)

OTHER PUBLICATIONS

Extended European Search Report in European Application No. 18866296.9, dated Aug. 23, 2019, 10 pages.

(Continued)

*Primary Examiner* — Jeffrey D. Popham
(74) *Attorney, Agent, or Firm* — Fish & Richardson P.C.

(57) ABSTRACT

Implementations of the present disclosure include generating, by a consensus node, a certificate signing request (CSR); sending the CSR to a first certificate authority (CA); receiving a first public key certificate of the consensus node from the first CA, and a first one or more public key certificates issued by a first one or more CAs. The consensus nodes also sends the CSR to a second CA, receives a second public key certificate of the consensus node from the second CA, and a second one or more public key certificates issued by a second one or more CAs. The consensus node further configures a first truststore including the first public key certificate and the first one or more public key certificates, and a second truststore including the second public key certificate and the second one or more public key certificates.

20 Claims, 6 Drawing Sheets

(51) Int. Cl.
  *H04L 9/06* (2006.01)
  *H04L 9/30* (2006.01)
(52) U.S. Cl.
  CPC .............. *H04L 9/30* (2013.01); *H04L 9/3239* (2013.01); *H04L 9/3247* (2013.01); *H04L 2209/38* (2013.01)

(56) References Cited

U.S. PATENT DOCUMENTS

| | | | |
|---|---|---|---|
| 8,707,027 B1* | 4/2014 | Naik | H04L 63/0823 380/258 |
| 9,021,255 B1 | 4/2015 | Aharoni et al. | |
| 2005/0289084 A1 | 12/2005 | Thayer et al. | |
| 2006/0282670 A1* | 12/2006 | Karchov | H04L 63/0823 713/175 |
| 2011/0213966 A1 | 9/2011 | Fu et al. | |
| 2017/0331896 A1 | 11/2017 | Holloway et al. | |
| 2018/0019879 A1* | 1/2018 | Kravitz | G06Q 20/401 |
| 2018/0183587 A1 | 6/2018 | Won et al. | |
| 2019/0034459 A1 | 1/2019 | Qiu | |
| 2019/0036682 A1 | 1/2019 | Qiu | |
| 2019/0036711 A1 | 1/2019 | Qiu | |

FOREIGN PATENT DOCUMENTS

| | | |
|---|---|---|
| CN | 107592293 | 1/2018 |
| CN | 108696348 A | 10/2018 |
| EA | 007089 | 6/2007 |
| EP | 3133789 | 1/2019 |
| KR | 20170002577 | 1/2017 |
| KR | 101727525 | 4/2017 |
| RU | 2300845 | 6/2007 |
| WO | WO 2004028077 | 4/2004 |

OTHER PUBLICATIONS

Cachin, ibm.com [online], "Architecture of the Hyperledger Blockchain Fabric*," Jul. 2016, retrieved on Aug. 23, 2019, retrieved from URL<https://pdfs.semanticscholar.org/f852/c5f3fe649f8a17ded391df0796677a59927f.pdf>, 4 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion issued in International Application No. PCT/CN2018/114417 dated Jun. 27, 2019, 6 pages.

KS X ISO 15782-1:2003, "Certificate management for financial services—Part 1: Public key" Sep. 2007, 55 pages (with English abstract).

* cited by examiner

US 10,887,114 B2

MANAGING COMMUNICATIONS AMONG CONSENSUS NODES AND CLIENT NODES

CROSS-REFERENCE TO RELATED APPLICATIONS

This application is a continuation of PCT Application No. PCT/CN2018/114417, filed on Nov. 7, 2018, which is hereby incorporated by reference in its entirety.

BACKGROUND

Blockchain networks, which can also be referred to as blockchain systems, consensus networks, distributed ledger system (DLS) networks, or blockchain, enable participating entities to securely, and immutably store data. A blockchain can be described as a ledger of transactions and multiple copies of the blockchain are stored across the blockchain network. Example types of blockchains can include public blockchains, consortium blockchains, and private blockchains. A public blockchain is open for all entities to use the blockchain, and participate in the consensus process. A consortium blockchain is a blockchain where the consensus process is controlled by a pre-selected set of nodes. A private blockchain is provided for a particular entity, which centrally controls read and write permissions.

The consortium blockchain system can include consensus nodes and client nodes (or users) that use the consortium network. On the one hand, the consensus nodes communicate with other consensus nodes to reach consensus. On the other hand, the consensus nodes communicate with client nodes to accept and add new transactions to the blocks. In some cases, consensus nodes also communicate with networks of pre-selected nodes of a consortium system or other core systems with different security levels. As such, boundaries can be set for different types of communications to protect data privacy, and security.

SUMMARY

Implementations of the present disclosure are directed to managing communications between consensus nodes, and communications between consensus nodes and client nodes. More particularly, implementations of the present disclosure are directed to configuring root certificates issued by respective certificate authorities (CAs) for communications between consensus nodes, and between consensus nodes and client nodes, so that client nodes cannot access consensus messages communicated between consensus nodes.

In some implementations, actions include generating, by a consensus node, a certificate signing request (CSR); sending the CSR to a first certificate authority (CA); receiving a first public key certificate of the consensus node from the first CA in response to the CSR, and a first one or more public key certificates of one or more other consensus nodes issued by a first one or more CAs; sending the CSR to a second CA; receiving a second public key certificate of the consensus node from the second CA in response to the CSR, and a second one or more public key certificates of one or more client nodes issued by a second one or more CAs; and configuring, on the consensus node, a first truststore including the first public key certificate and the first one or more public key certificates of the one or more other consensus nodes, and a second truststore including the second public key certificate and the second one or more public key certificates of the one or more client nodes. Other implementations include corresponding systems, apparatus, and computer programs, configured to perform the actions of the methods, encoded on computer storage devices.

These and other implementations may each optionally include one or more of the following features: determining the first one or more CAs and the second one or more CAs; receiving root certificates from the first one or more CAs and the second one or more CAs; and verifying the root certificates based on corresponding public keys of the first one or more CAs and the second one or more CAs; wherein the CSR includes the public key and information to be included in the first public key certificate or the second public key certificate; wherein the CSR is digitally signed by the consensus node using a private key; wherein at least one of a portion of the first one or more public key certificates are self-signed by corresponding consensus nodes, or a portion of the second one or more public key certificates are self-signed by corresponding client nodes; generating a self-signed certificate of the public key using a corresponding private key of the consensus node; and configuring, on the consensus node, the private key of the consensus node and the self-signed certificate; wherein the first public key certificate, the first one or more public key certificates, the second public key certificate, and the second one or more public key certificates are transport layer security (TLS) certificates.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
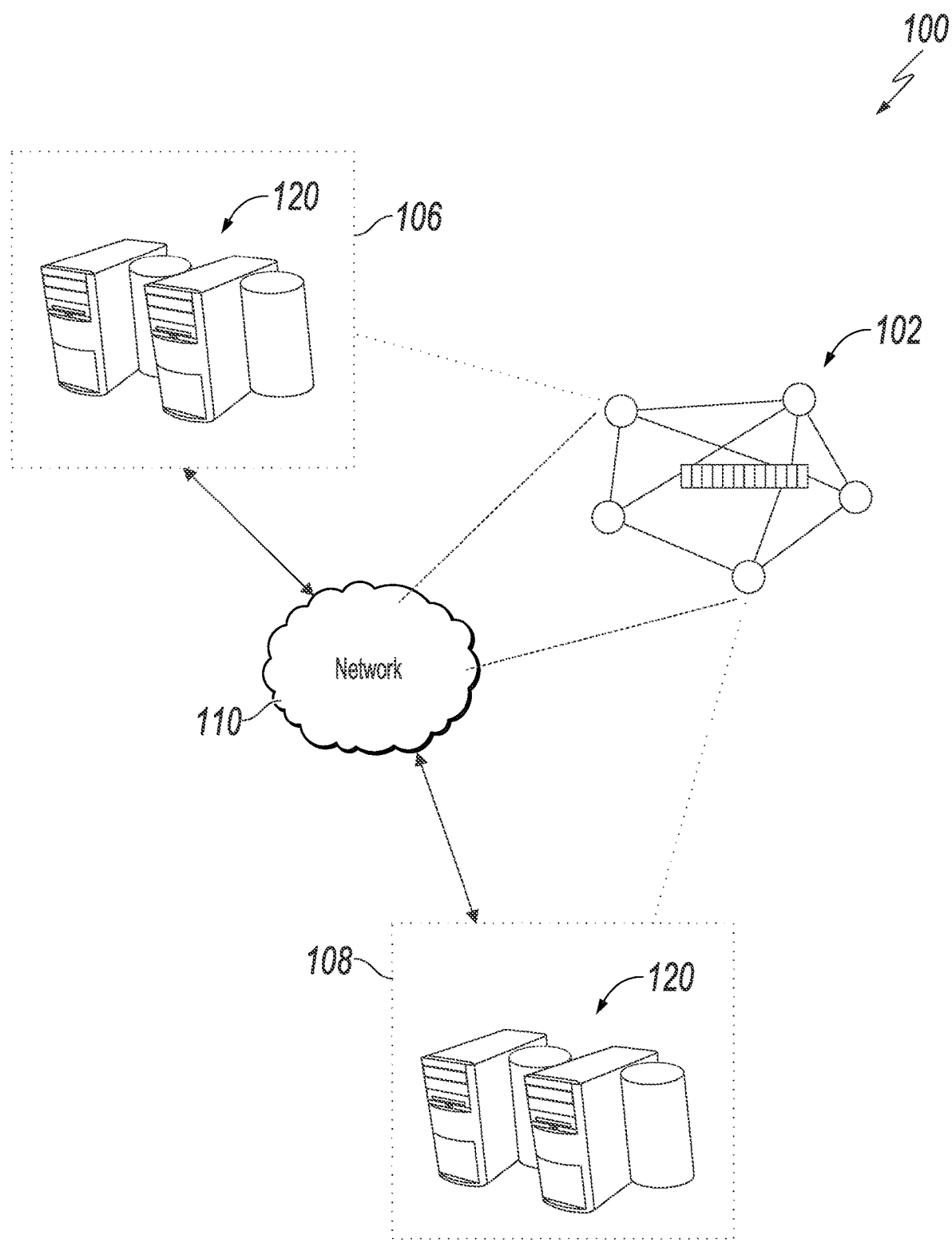
FIG. 1 depicts an example environment that can be used to execute implementations of the present disclosure.

Implementations of the present disclosure are directed to managing communications between consensus nodes, and communications between consensus nodes and client nodes. More particularly, implementations of the present disclosure are directed to configuring root certificates issued by respective certificate authorities (CAs) for communications between consensus nodes, and between consensus nodes and client nodes, so that client nodes cannot access consensus messages communicated between consensus nodes.

In some implementations, actions include generating, by a consensus node, a certificate signing request (CSR); sending the CSR to a first certificate authority (CA); receiving a first public key certificate of the consensus node from the first CA in response to the CSR, and a first one or more public key certificates of one or more other consensus nodes issued by a first one or more CAs; sending the CSR to a second CA; receiving a second public key certificate of the consensus node from the second CA in response to the CSR, and a second one or more public key certificates of one or more client nodes issued by a second one or more CAs; and configuring, on the consensus node, a first truststore including the first public key certificate and the first one or more public key certificates of the one or more other consensus nodes, and a second truststore including the second public key certificate and the second one or more public key certificates of the one or more client nodes.

To provide further context for implementations of the present disclosure, and as introduced above, blockchain networks, which can also be referred to as consensus networks (e.g., made up of peer-to-peer nodes), distributed ledger system, or simply blockchain, enable participating entities to securely and immutably conduct transactions, and store data. A blockchain can be provided as a public blockchain, a private blockchain, or a consortium blockchain. Implementations of the present disclosure are described in further detail herein with reference to a public blockchain, which is public among the participating entities. It is contemplated, however, that implementations of the present disclosure can be realized in any appropriate type of blockchain.

In a consortium blockchain, the consensus process is controlled by an authorized set of nodes, one or more nodes being operated by a respective entity (e.g., an enterprise). For example, a consortium of ten (10) entities (e.g., companies) can operate a consortium blockchain system, each of which operates at least one node in the consortium DLS. Accordingly, the consortium blockchain system can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain. An example consortium blockchain system includes Quorum, developed by J.P. Morgan Chase & Co. of New York, N.Y. Quorum can be described as an enterprise-focused, permissioned blockchain infrastructure specifically designed for financial use cases. Quorum is built off of Go Ethereum, the base code for the Ethereum blockchain, which is provided by the Ethereum Foundation of Zug, Switzerland.

In general, a consortium blockchain system supports transactions between entities participating, with permission, in the consortium blockchain system. A transaction is shared with all of the nodes within the consortium blockchain system, because the blockchain is replicated across all nodes. That is, all nodes are in perfect state of consensus with respect to the blockchain. To achieve consensus (e.g., agreement to the addition of a block to a blockchain), a consensus protocol is implemented within the consortium blockchain network. An example consensus protocol includes, without limitation, proof-of-work (POW) implemented in the Bitcoin network.

Implementations of the present disclosure are described in further detail herein in view of the above context. More particularly, and as introduced above, implementations of the present disclosure are directed to configuring root certificates issued by respective CAs for communications between consensus nodes, and between consensus nodes and client nodes, so that client nodes cannot access consensus messages communicated between consensus nodes.

FIG. 1 depicts an example environment 100 that can be used to execute implementations of the present disclosure. In some examples, the example environment 100 enables entities to participate in a public blockchain 102. The example environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain system 102, for storing transactions in a blockchain 104. Example computing devices include, without limitation, a server, a desktop computer, a laptop computer, a tablet computing device, and a smartphone. In some examples, the computing systems 106, 108 host one or more computer-implemented services for interacting with the consortium blockchain system 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the consortium blockchain system 102 is represented as a peer-to-peer network of nodes, and the computing systems 106, 108 provide nodes of the first entity, and second entity respectively, which participate in the consortium blockchain system 102.

Figure 2:
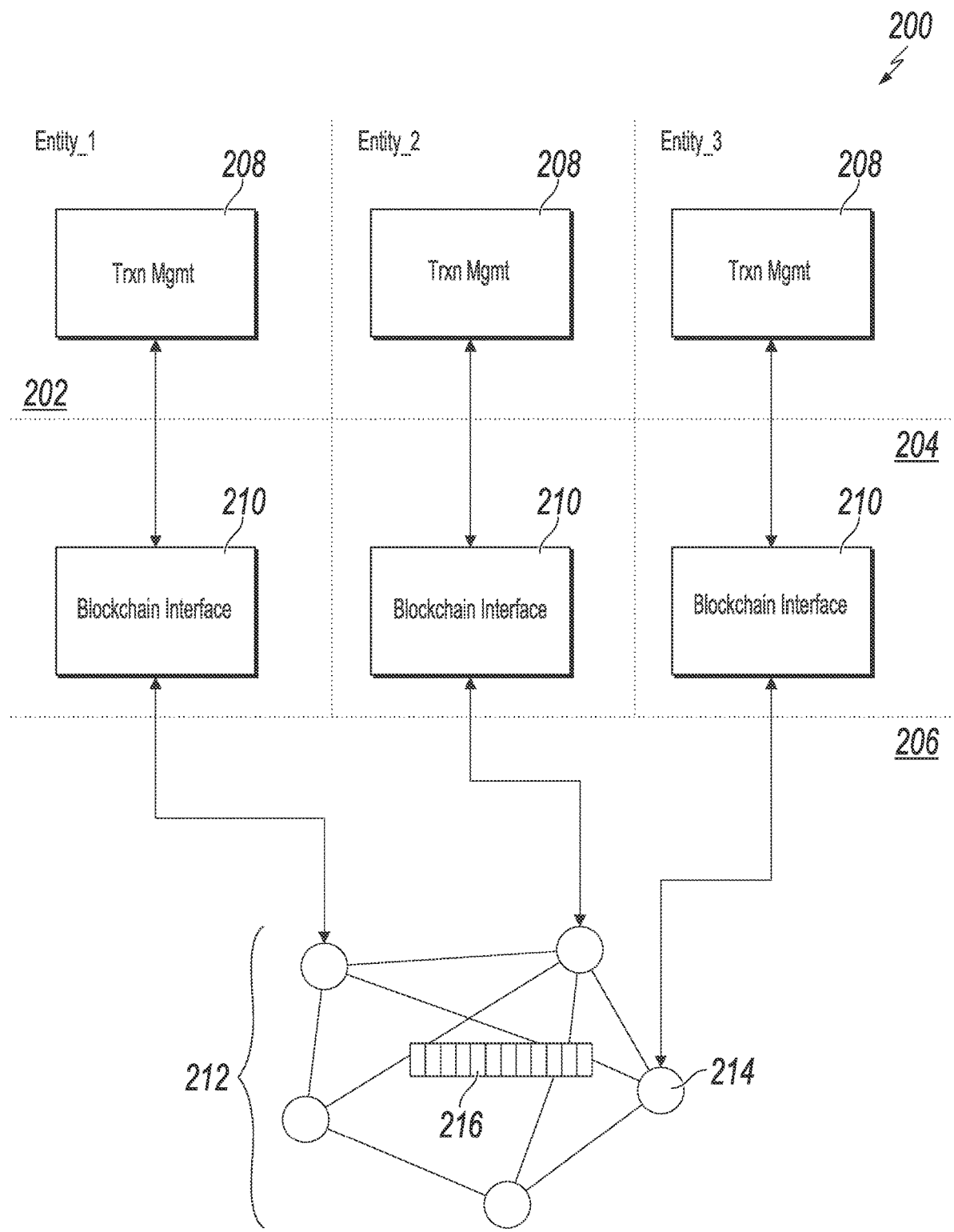
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a blockchain layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes blockchain interfaces 210 for each transaction management system 208. In some examples, a respective transaction management system 208 communicates with a respective blockchain interface 210 over a network (e.g., the network 110 of FIG. 1) using a communication protocol (e.g., hypertext transfer protocol secure (HTTPS)). In some examples, each blockchain interface 210 provides a communication connection between a respective transaction management system 208, and the blockchain layer 206. More particularly, each blockchain interface 210 enables the respective entity to conduct transactions recorded in a consortium blockchain system 212 of the blockchain layer 206. In some examples, communication between a blockchain interface 210, and the blockchain layer 206 is conducted using remote procedure calls (RPCs). In some examples, the blockchain interfaces 210 "host" consensus nodes for the respective transaction management systems 208. For example, the blockchain interfaces 210 provide the application programming interface (API) for access to the consortium blockchain system 212.

A blockchain system can include consensus nodes and client nodes. The consensus nodes can participate in the consensus process. The client nodes can use the blockchain system, but do not participate in the consensus process. In some implementations, the consensus nodes can participate in the consensus process while using the blockchain system for other purposes. In some implementations, the consensus nodes can communicate with client nodes, so that users can use the client nodes to submit transactions to the blockchain. The consensus nodes can also communicate with each other to reach consensus in order to add the transactions from the client nodes to the blockchain.

In some implementations, communications between consensus nodes, and communications between consensus nodes and client nodes can be performed based on cryptographic protocols, such as the transport layer security (TLS) protocol, to ensure communications security.

To enhance privacy and manage data that can be accessed by different nodes, the communications between the consensus nodes can be isolated from the communications between the consensus nodes and client nodes. In some implementations, the isolation can be done by forming different TLS truststores of public key certificates of different nodes. The public key certificates can be issued by respective certificate authorities (CAs) for communications between the consensus nodes, and communications between consensus nodes and client nodes.

Figure 3A:
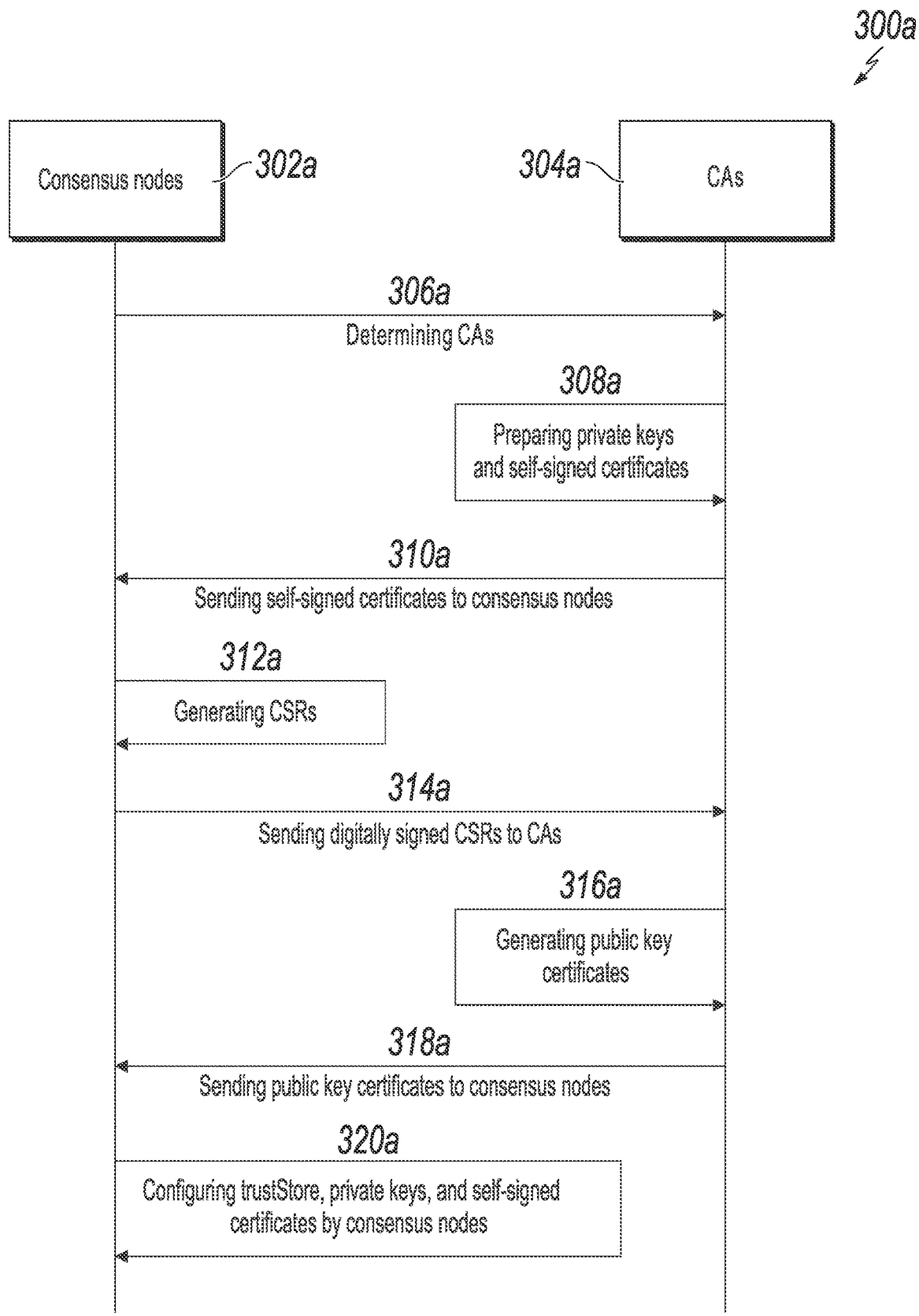
FIG. 3A depicts an example process of configuring communications between consensus nodes in accordance with implementations of the present disclosure.

FIG. 3A depicts an example process 300a for configuring communications between consensus nodes 302a in accordance with implementations of the present disclosure. The consensus nodes 302a can be implemented using any appropriate electronic device such as a computer, a smartphone, or a server, connected to the blockchain network.

At 306a, the consensus nodes 302a identify one or more CAs 304a that can be trusted. In some implementations, the CAs can be entities that issue public key certificates. Public key certificates can be used to certify ownership of public keys by the named subjects of the certificate. The named subjects can be the CAs themselves, or other entities that want their public keys to be certified. Public keys owned and self-signed by CAs can become root certificates. In some cases, at least a portion of the consensus nodes 302a can be identified as CAs. In such cases, those consensus nodes can self-sign their public keys to generate public key certificates. In cases, the public key certificates generated based on TLS protocols can be referred to as TLS certificates.

At 308a, the CAs 304a prepare their private keys and self-signed certificates. The self-signed certificates can be the CAs root certificate of their corresponding public keys.

At 310a, the CAs 304a send the self-signed certificates to the consensus nodes 302a. In some implementations, the self-signed certificates can include digital signatures of the CAs 304a signed using their corresponding private keys. As such, the consensus nodes 302a can verify that the certificates are issued by the CAs 304a using the public keys of the CAs 304a public keys.

At 312a, the consensus nodes 302a generate certificate signing requests (CSRs). The CSRs are blocks of encoded text that are given to the CAs 304a when applying for TLS certificates. In some examples, the CSRs can contain information that will be included in the TLS certificates, such as an organization name, common name (domain name), locality, and country. The CSRs can also contain the public keys to be included in the TLS certificates. The consensus nodes 302a can create the private keys when creating the CSRs, and use the private keys to sign the corresponding CSRs.

At 314a, the consensus nodes 302a send the CSRs to the CAs 304a. At 316a, the CAs 304a generate public key certificates for the consensus nodes 302a in response to the CSRs. The CAs 304a can verify whether the digital signatures corresponding to the CSRs are correct from the consensus nodes 302a, before generating the public key certificates for the consensus nodes 302a.

At 318a, the CAs 304a send the public key certificate to the consensus nodes 302a. The CAs 304a can send the public key certificates to all of the consensus nodes 302a in the blockchain network. As such, each consensus node 302a can have a copy of the public key certificates of all other consensus nodes 302a in the network.

At 320a, the consensus nodes 302a configure truststores, private keys, and self-signed certificates. Truststores can be used to store TLS certificates from trusted CAs 304a. By receiving and verifying the TLS certificates from the trusted CAs, the consensus nodes 302a can use the certified public keys to encrypt messages and securely communicate with other consensus nodes in the network. In some implementations, the consensus nodes 302a can also generate self-signed public key certificates using a corresponding private key of the corresponding consensus nodes 302a. The private key can also be used to decrypt messages from other nodes in the blockchain network encrypted using the corresponding consensus node's 302a public key.

In some implementations, the blockchain network can be configured such that communications between consensus nodes, and communications between consensus nodes and client nodes are isolated. That is, the client nodes cannot access data communicated between consensus nodes, and consensus nodes cannot access data communicated between other consensus nodes and their connected client nodes. In some examples, the consensus nodes that perform consensus can request TLS certificates from a first set of CAs, and consensus node/client node pairs that communicate with each other can request TLS certificates from CAs different from the first set of Cas, or do not perform public key encryption of their data.

Figure 3B:
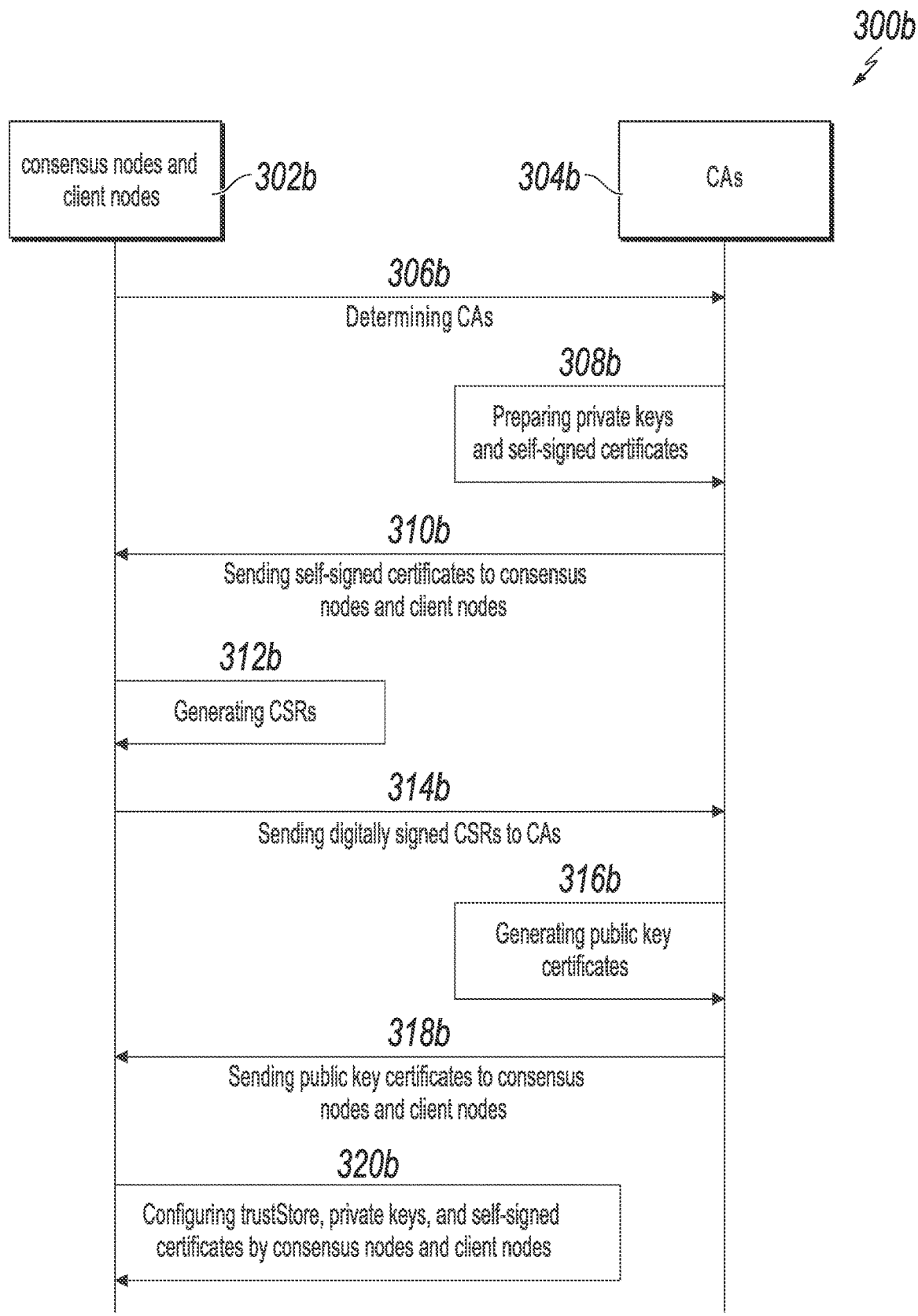
FIG. 3B depicts an example process of configuring communications between consensus nodes and client nodes in accordance with implementations of the present disclosure.

FIG. 3B depicts an example process 300b for configuring communications between consensus nodes and client nodes 302b in accordance with implementations of the present disclosure.

At 306b, the consensus nodes and client nodes 302b identify one or more CAs 304b different from the CAs 304a identified in the example process 300a discussed above with reference to FIG. 3A. In some implementations, each consensus node/client node pair can identify a different CA, such that their communications can be isolated from others. In some implementations, each client node and the consensus node it communicates with can form a small scale network, and identify one or more CAs not used by other client nodes or the consensus nodes 302a for consensus. In some cases, at least a portion of the consensus nodes and the client nodes 302b can identify themselves as CAs. In such cases, those consensus nodes can self-sign their public keys to generate public key certificates, as long as the certificates are not self-signed by consensus nodes 302a for communications with other consensus nodes in the example process 300a.

At 308b, the CAs 304b prepare their private keys and self-signed certificates. The self-signed certificates can be the CAs root certificates of their corresponding public keys.

At 310b, the CAs 304b send the self-signed certificates to the consensus nodes and the client nodes 302b. In some implementations, the self-signed certificates can include the digital signatures of the CAs 304b signed using their respective private keys. As such, the consensus nodes and client nodes 302b can verify that the certificates are issued by the CAs 304b using the public keys of the CAs 304b.

At 312b, the consensus nodes and client nodes 302b generate CSRs. The consensus nodes and client nodes 302b can create the private keys when creating the CSRs, and use the private keys to sign the corresponding CSRs.

At 314b, the consensus nodes and client nodes 302b send the CSRs to the CAs 304b. At 316b, the CAs 304b generate public key certificates for the consensus nodes and client nodes 302b in response to the CSRs. The CAs 304b can verify whether the digital signatures corresponding to the CSRs are correct, before generating the public key certificates for the consensus nodes.

At 318b, the CAs 304b send the public key certificate to the consensus nodes and client nodes 302b. In some implementations, different CAs can send public key certificates to different consensus node(s)/client node pairs to form a small scale certificate truststore. As such, each client node pair can have public key certificates of consensus node(s) issued by different CAs to ensure privacy of communications.

At 320b, the consensus nodes and client nodes 302b configure truststores, private keys, and self-signed certificates. Because different client nodes can have different truststores of TLS certificates for encrypted communications, and the consensus nodes can have their own trustStore of TLS certificates for encrypted communications, data privacy of communications performed by different parties can be protected.

Figure 4:
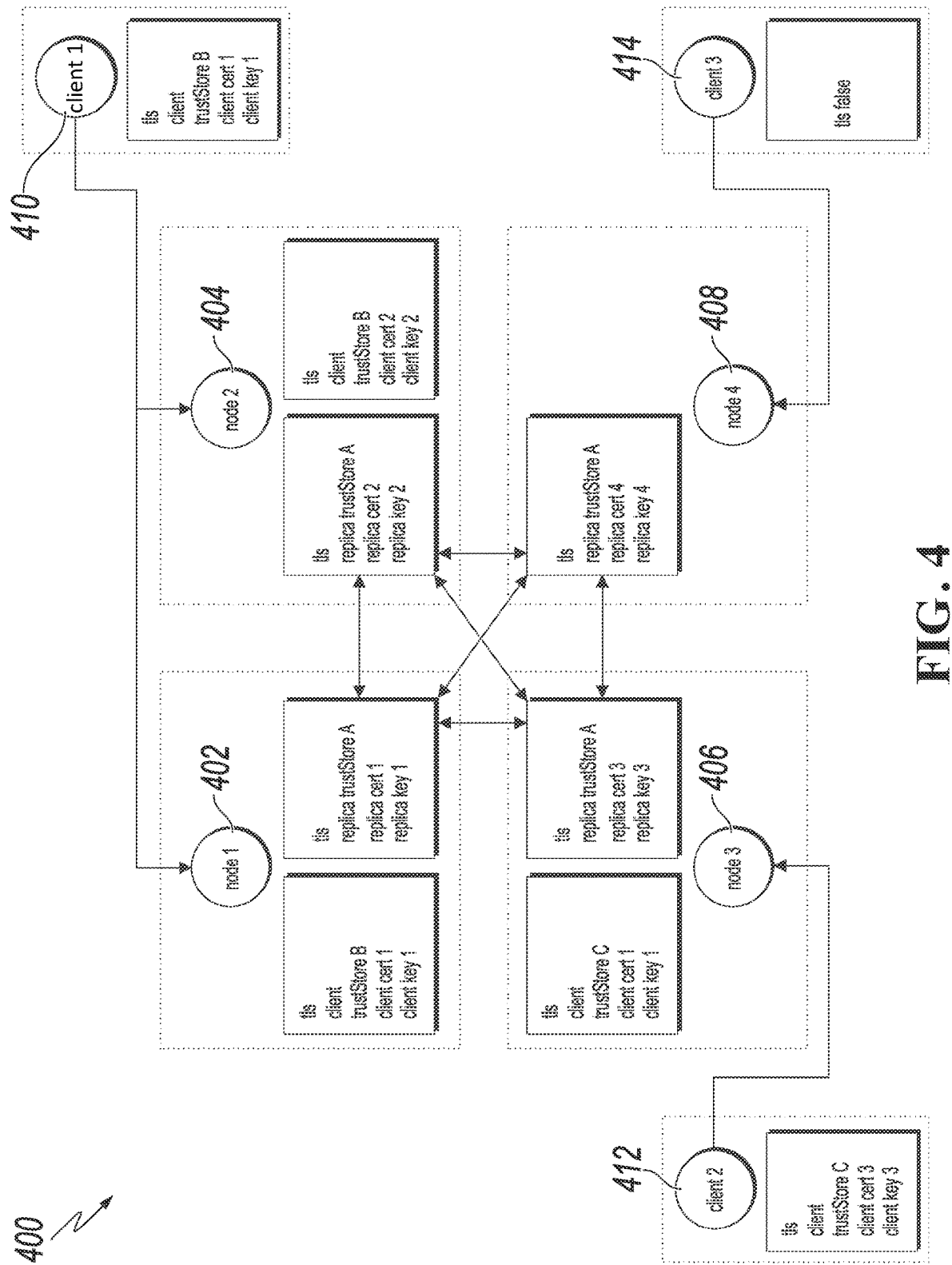
FIG. 4 depicts an example configurations for communications between consensus nodes and client nodes in accordance with implementations of the present disclosure.

FIG. 4 depicts an example blockchain system 400, and configuration for communications between consensus nodes and client nodes in accordance with implementations of the present disclosure. At a high-level, the example blockchain system 400 includes four consensus nodes: node 1 302, node 2 304, node 3 306 and node 4 308. Three client nodes, client 1 310, client 2 312, and client 3 314, are connected to the consensus nodes. The client 1 310 is connected to the node 1 310, and the node 2 312, the client 2 312 is connected to the node 3 306, and the client 3 314 is connected to the node 4 308. The consensus nodes can communicate with the client nodes, so that users can submit transactions from client nodes to consensus nodes. The consensus nodes can communicate with each other to execute a consensus process to add the transactions from client nodes to the blockchain.

For communications among the consensus nodes, the node 1 402, the node 2 404, the node 3 406, and the node 4 408 can each obtain a blockchain replica of a truststore A. The truststore A can include TLS certificates of the node 1 402, the node 2 404, the node 3 406, and the node 4 408 issued by a first set of CAs. In some implementations, the consensus nodes can be the CAs to self-sign their corresponding public key certificates. The node 1 402, the node 2 404, the node 3 406, and the node 4 408 can also be configured with their respective private key and self-signed certificates. As such, communications between the node 1 402, the node 2 404, the node 3 406, and the node 4 408 can be based on TLS certificates of the truststore A.

The client 1 410 is connected for communication with the node 1 402 and the node 2 404. The client 1 410, the node 1 402, and the node 2 404 can each obtain a blockchain replica of a trustore B. The truststore B can include TLS certificates of the client 1 410, the node 1 402, and the node 2 404 issued by a second set of CAs. Again, the TLS certificates can be self-signed as long as the signing authority is different from the authority used to sign TLS certificates for other communications to be isolated from. The client 1 410, the node 1 402, and the node 2 404 can also be configured with their respective private key and self-signed certificates. As such, communications between the client 1 410 and the node 1 402, and between the client 1 410 and the node 2 404 can be based on TLS certificates of the truststore B.

In some implementations, although the node 1 402 and the node 2 404 maintain both the truststore A and the truststore B, they may only communicate with each other based on TLS certificates of the truststore A. They cannot communicate based on the TLS certificates of the truststore B. Correspondingly, the client 1 410 cannot view consensus messages communicated between the node 1 402 and the node 2 404.

The client 2 412 is connected for communication with the node 3 406. The client 2 412 and the node 3 406 can each obtain a blockchain replica of a trustore C. The truststore C can include TLS certificates of the client 2 412 and the node 3 406 issued by a third set of CAs. The client 2 412 and the node 3 406 can also be configured with their respective private key and self-signed certificates. As such, communications between the client 2 412 and the node 3 406 can be based on TLS certificates of the truststore C.

The client 3 414 is connected with the node 4 408. The communications between the client 3 414 and the node 4 408 are unencrypted. As such, the client 3 414 does not need to maintain public key certificates for communications. However, the client 3 414 can assume the risk of identity theft, such as other nodes pretending to be the client 3 414 to communicate with node 4 408.

Figure 5:
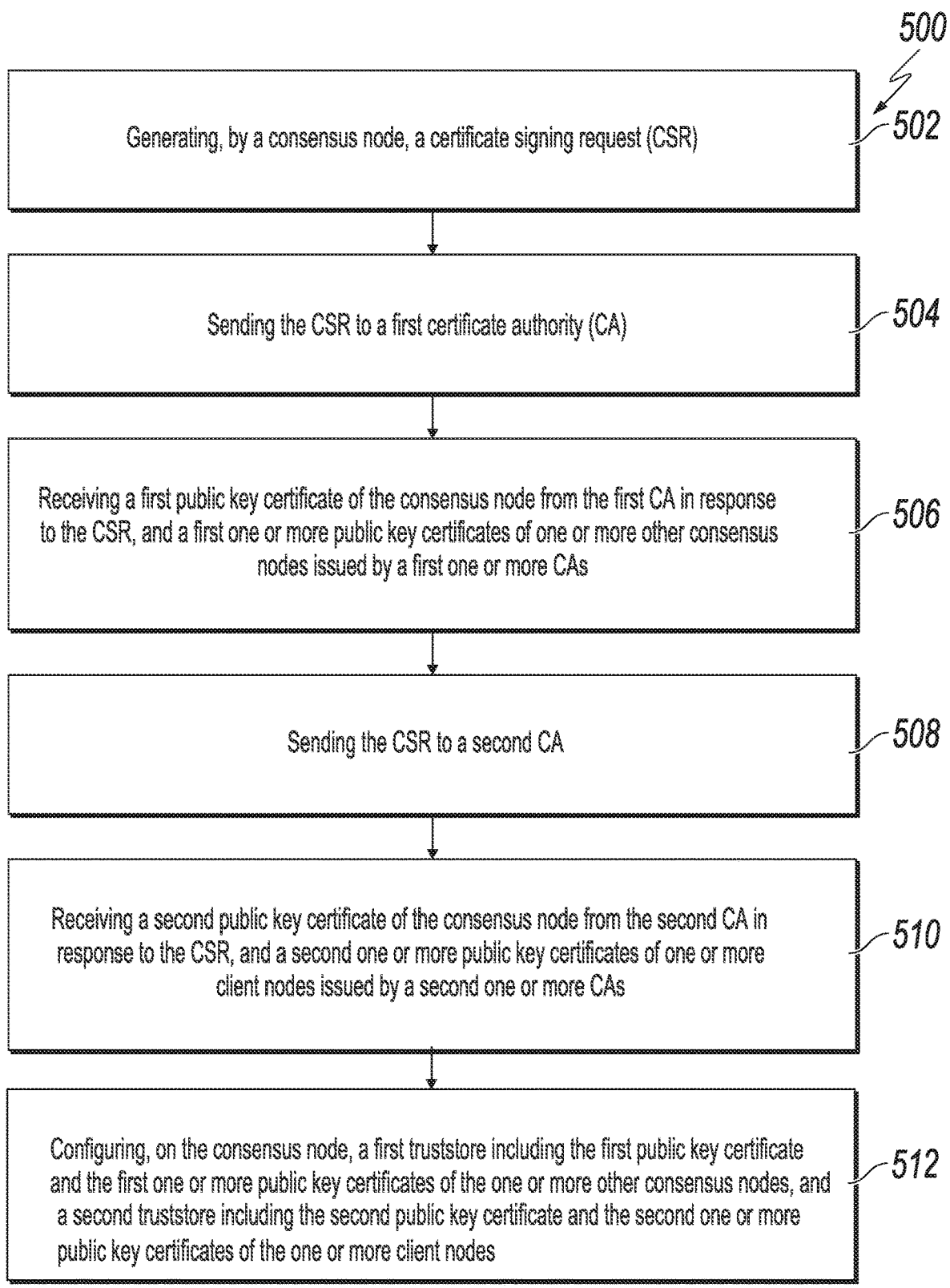
FIG. 5 depicts an example method of managing consensus nodes and client nodes communications in accordance with implementations of the present disclosure.

FIG. 5 depicts an example process 500 for managing consensus node and client node communications in accordance with implementations of the present disclosure. For clarity of presentation, the description that follows generally describes the example process 500 in the context of the other figures in this description. However, it will be understood that the example process 500 can be performed, for example, by any system, environment, software, and hardware, or a combination of systems, environments, software, and hardware, as appropriate. In some implementations, various steps of the example process 500 can be run in parallel, in combination, in loops, or in any order.

At 502, a consensus node generates a CSR. In some implementations, before generating the CSR, the consensus node can identify a first one or more CAs, and a second one or more CAs. The consensus node can also receive root certificates from the first one or more CAs, and the second one or more CAs, and verify the root certificates based on respective public keys of the first one or more CAs, and the second one or more CAs. In some implementations, the CSR includes the public key and information to be included in the first public key certificate, or the second public key certificate. In some implementations, the CSR is digitally signed by the consensus node using a private key.

At 504, the consensus node sends the CSR to a first CA.

At 506, the consensus node receives a first public key certificate of the consensus node from the first CA in response to the CSR, and a first one or more public key certificates of one or more other consensus nodes issued by the first one or more CAs. In some implementations, at least one of a portion of the first one or more public key certificates are self-signed by corresponding consensus nodes, or a portion of the second one or more public key certificates are self-signed by corresponding client nodes.

At 508, the consensus node sends the CSR to a second CA. In some implementations, at least one of a portion of the first one or more public key certificates are self-signed by corresponding consensus nodes, or a portion of the second one or more public key certificates are self-signed by corresponding client nodes.

At 510, the consensus node receives a second public key certificate of the consensus node from the second CA in response to the CSR, and a second one or more public key certificates of one or more client nodes issued by a second one or more CAs.

At 512, the consensus node configures a first truststore and a second truststore. The first truststore includes the first public key certificate, and the first one or more public key certificates of the one or more other consensus nodes. The second truststore includes the second public key certificate, and the second one or more public key certificates of the one or more client nodes.

In some implementations, the consensus node can generate a self-signed certificate of the public key using a corresponding private key of the consensus node. The consensus node can also configure the private key of the consensus node, and the self-signed certificate.

In some implementations, the first public key certificate, the first one or more public key certificates, the second public key certificate, and the second one or more public key certificates are TLS certificates.

Implementations and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, implementations can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for isolating a first communication connection from a second communication connection via configuring two separate truststores, comprising:

identifying, by a first consensus node, a first certificate authority (CA) group of one or more CAs;

generating, by the first consensus node, a first certificate signing request (CSR) corresponding to the first CA group;

sending, by the first consensus node, the first CSR to the first CA group;

receiving, by the first consensus node, a first set of public key certificates from the first CA group, wherein the first set of public key certificates comprises (i) a first public key certificate issued to the first consensus node in response to the first CSR, and (ii) a second public key certificate issued to a second consensus node;

configuring, on the first consensus node, a first truststore based on the first set of public key certificates;

identifying, by the first consensus node, a second CA group of one or more CAs, wherein the first CA and the second CA group are mutually exclusive;

generating, by the first consensus node, a second CSR corresponding to the second CA group;

sending, by the first consensus node, the second CSR to the second CA group;

receiving, by the first consensus node, a second set of public key certificates from the second CA group, wherein the second set of public key certificates data indicating comprises (i) a third public key certificate issued to the first consensus node in response to the second CSR, and (ii) a fourth public key certificate issued to a client node;

configuring, on the first consensus node, a second truststore based on the second set of public key certificates comprising the third public key certificate and the fourth public key certificate;

establishing the first communication connection between the first consensus node and the second consensus node using the first public key certificate and the second public key certificate of the first set of public key certificates stored within the first truststore, wherein communications through the first communication connection are encrypted using the first public key certificate and the second public key certificate; and establishing the second communication connection between the first consensus node and the client node using the third public key certificate and the fourth public key certificate of the second set of public key certificates stored within the second truststore, wherein communications through the second communication connection are encrypted using the third public key certificate and the fourth public key certificate.

2. The computer-implemented method of claim 1, further comprising:

receiving, by the first consensus node, root certificates from the first CA group and the second CA group; and verifying, by the first consensus node, the root certificates based on corresponding public keys of the first CA group and the second CA group.

3. The computer-implemented method of claim 2, wherein the first CSR is digitally signed by the first consensus node using a private key.

4. The computer-implemented method of claim 1, wherein the first CSR includes a public key and an organization name to be included in the first public key certificate.

5. The computer-implemented method of claim 1, wherein at least one of a portion of the second public key certificate is self-signed by the second consensus node, or a portion of the fourth public key certificate is self-signed by the client node.

6. The computer-implemented method of claim 1, further comprising:
   generating, by the first consensus node, a self-signed certificate of the first public key using a corresponding private key of the first consensus node; and
   configuring, on the first consensus node, the private key of the first consensus node and the self-signed certificate.

7. The computer-implemented method of claim 1, wherein the first public key certificate, the second public key certificate, the third public key certificate, and the fourth public key certificate are transport layer security (TLS) certificates.

8. The method of claim 1, wherein:
   the client node is configured to be restricted from accessing the first public key certificate and the second public key certificate included in the first truststore; and
   the second consensus node is configured to be restricted from accessing the third public key certificate and the fourth public key certificate included in the second truststore.

9. A non-transitory, computer-readable medium storing instructions executable by one or more computing devices to perform operations for isolating a first communication connection from a second communication connection via configuring two separate truststores, the operations comprising:
   identifying, by a first consensus node, a first certificate authority (CA) group of one or more CAs;
   generating, by the first consensus node, a first certificate signing request (CSR) corresponding to the first CA group;
   sending, by the first consensus node, the first CSR to the first CA group;
   receiving, by the first consensus node, a first set of public key certificates from the first CA group, wherein the first set of public key certificates comprises (i) a first public key certificate issued to the first consensus node in response to the first CSR, and (ii) a second public key certificate issued to a second consensus node;
   configuring, on the first consensus node, a first truststore based on the first set of public key certificates;
   identifying, by the first consensus node, a second CA group of one or more CAs, wherein the first CA and the second CA group are mutually exclusive;
   generating, by the first consensus node, a second CSR corresponding to the second CA group;
   sending, by the first consensus node, the second CSR to the second CA group;
   receiving, by the first consensus node, a second set of public key certificates from the second CA group, wherein the second set of public key certificates comprises (i) a third public key certificate issued to the first consensus node in response to the second CSR, and (ii) a fourth public key certificate issued to a client node;
   configuring, on the first consensus node, a second truststore based on the second set of public key certificates including comprising the third public key certificate and the fourth public key certificate;
   establishing the first communication connection between the first consensus node and the second consensus node using the first public key certificate and the second public key certificate of the first set of public key certificates stored within the first truststore, wherein communications through the first communication connection are encrypted using the first public key certificate and the second public key certificate; and
   establishing the second communication connection between the first consensus node and the client node using the third public key certificate and the fourth public key certificate of the second set of public key certificates stored within the second truststore, wherein communications through the second communication connection are encrypted using the third public key certificate and the fourth public key certificate.

10. The non-transitory, computer-readable medium of claim 9, the operations further comprising:
    receiving, by the first consensus node, root certificates from the first CA group and the second CA group; and
    verifying, by the first consensus node, the root certificates based on corresponding public keys of the first CA group and the second CA group.

11. The non-transitory, computer-readable medium of claim 10, wherein the first CSR is digitally signed by the first consensus node using a private key.

12. The non-transitory, computer-readable medium of claim 9, wherein the first CSR includes a public key and an organization name to be included in the first public key certificate.

13. The non-transitory, computer-readable medium of claim 9, wherein at least one of a portion of the second public key certificate is self-signed by the second consensus node, or a portion of the fourth public key certificate is self-signed by the client node.

14. The non-transitory, computer-readable medium of claim 9, the operations further comprising:
    generating, by the first consensus node, a self-signed certificate of the first public key using a corresponding private key of the first consensus node; and
    configuring, on the first consensus node, the private key of the first consensus node and the self-signed certificate.

15. The non-transitory, computer-readable medium of claim 9, wherein the first public key certificate, the second public key certificate, the third public key certificate, and the fourth public key certificate are transport layer security (TLS) certificates.

16. A system, comprising:
    one or more computers; and
    one or more computer-readable memories coupled to the one or more computers and having instructions stored thereon which are executable by the one or more computers to perform operations for isolating a first communication connection from a second communication connection via configuring two separate truststores, the operations comprising:
       identifying, by a first consensus node, a first certificate authority (CA) group of one or more CAs;
       generating, by the first consensus node, a first certificate signing request (CSR) corresponding to the first CA group;
       sending, by the first consensus node, the first CSR to the first CA group;
       receiving, by the first consensus node, a first set of public key certificates from the first CA group, wherein the first set of public key certificates comprises (i) a first public key certificate issued to the first consensus node in response to the first CSR, and (ii) a second public key certificate issued to a second consensus node;
       configuring, on the first consensus node, a first truststore based on the first set of public key certificates;
       identifying, by the first consensus node, a second CA group of one or more CAs, wherein the first CA and the second CA group are mutually exclusive;
       generating, by the first consensus node, a second CSR corresponding to the second CA group;

sending, by the first consensus node, the second CSR to the second CA group;
receiving, by the first consensus node, a second set of public key certificates from the second CA group, wherein the second set of public key certificates comprises (i) a third public key certificate issued to the first consensus node in response to the second CSR, and (ii) a fourth public key certificate issued to a client node;
configuring, on the first consensus node, a second truststore based on the second set of public key certificates comprising the third public key certificate and the fourth public key certificate;
establishing the first communication connection between the first consensus node and the second consensus node using the first public key certificate and the second public key certificate of the first set of public key certificates stored within the first truststore, wherein communications through the first communication connection are encrypted using the first public key certificate and the second public key certificate; and
establishing the second communication connection between the first consensus node and the client node using the third public key certificate and the fourth public key certificate of the second set of public key certificates stored within the second truststore, wherein communications through the second communication connection are encrypted using the third public key certificate and the fourth public key certificate.

17. The system of claim 16, the operations further comprising:
receiving, by the first consensus node, root certificates from the first CA group and the second CA group; and
verifying, by the first consensus node, the root certificates based on corresponding public keys of the first CA group and the second CA group.

18. The system of claim 17, wherein the first CSR is digitally signed by the first consensus node using a private key.

19. The system of claim 16, wherein the first CSR includes a public key and an organization name to be included in the first public key certificate.

20. The system of claim 16, wherein at least one of a portion of the second public key certificate is self-signed by the second consensus node, or a portion of the fourth public key certificate is self-signed by the client node.

* * * * *